US011256770B2

(12) United States Patent
Bajaj et al.

(10) Patent No.: US 11,256,770 B2
(45) Date of Patent: Feb. 22, 2022

(54) DATA-DRIVEN ONLINE BUSINESS NAME GENERATOR

(71) Applicant: Go Daddy Operating Company, LLC, Scottsdale, AZ (US)

(72) Inventors: Tejas Prakash Bajaj, San Jose, CA (US); Salvador Celis, Bainbridge Island, WA (US); Tapan Kamdar, San Jose, CA (US); Wei-Cheng Lai, Cupertino, CA (US); Xiang Mao, Sunnyvale, CA (US); Yu Tian, Sunnyvale, CA (US); Jyothiprakash Trishuleshwar, Milpitas, CA (US); Wenbo Wang, Sunnyvale, CA (US); Grace Wardhana, San Carlos, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 0 days.

(21) Appl. No.: 16/400,928

(22) Filed: May 1, 2019

(65) Prior Publication Data

US 2020/0349208 A1 Nov. 5, 2020

(51) Int. Cl.
*G06F 16/9535* (2019.01)
*G06F 16/951* (2019.01)
*G06Q 10/06* (2012.01)
*G06F 3/0484* (2013.01)
*G06F 40/30* (2020.01)
*G06F 40/284* (2020.01)
*G06F 40/186* (2020.01)
*G06F 40/242* (2020.01)

(52) U.S. Cl.
CPC ........ *G06F 16/9535* (2019.01); *G06F 3/0484* (2013.01); *G06F 16/951* (2019.01); *G06F 40/284* (2020.01); *G06F 40/30* (2020.01); *G06Q 10/067* (2013.01); *G06F 40/186* (2020.01); *G06F 40/242* (2020.01)

(58) Field of Classification Search
CPC ... G06F 16/9535; G06F 16/951; G06F 40/284
See application file for complete search history.

(56) References Cited

U.S. PATENT DOCUMENTS

| | | | |
|---|---|---|---|
| 7,685,093 B1* | 3/2010 | Adams | G06F 16/242 |
| | | | 707/999.001 |
| 7,778,874 B1* | 8/2010 | Saunders | G06Q 30/0271 |
| | | | 705/14.67 |

(Continued)

*Primary Examiner* — Douglas B Blair
(74) *Attorney, Agent, or Firm* — Greenberg Traurig, LLP

(57) ABSTRACT

Systems and methods of the present invention provide for one or more server computers communicatively coupled to a network and configured to: identify a business name within an aggregation of business names; tokenize the business name; match a resulting token to an industry related keyword; generate a template with placeholders replacing a prefix or a suffix appended to the token from a recognized pattern; identify a request to generate a name candidate, select a personalized data associated with the requesting user and an associated industry; and generate a list of name candidates, with the personalized data inserted into the placeholder; then determines the availability and ranks each name candidate in the list.

16 Claims, 5 Drawing Sheets

(56) References Cited

U.S. PATENT DOCUMENTS

| | | | | |
|---|---|---|---|---|
| 8,024,347 B2* | 9/2011 | Patman Maguire | ........................ | G06F 16/2453 707/758 |
| 8,983,956 B1* | 3/2015 | Murphy | ................ | G06F 16/285 707/736 |
| 9,923,931 B1* | 3/2018 | Wagster | ................... | H04L 63/30 |
| 2005/0149507 A1* | 7/2005 | Nye | ....................... | G06F 16/951 |
| 2008/0005106 A1* | 1/2008 | Schumacher | ..... | G06F 16/24556 |
| 2009/0089284 A1* | 4/2009 | Patman Maguire | ........................ | G06F 16/2453 |
| 2009/0089630 A1* | 4/2009 | Goldenberg | ........ | G06F 16/2462 714/704 |
| 2011/0178868 A1* | 7/2011 | Garg | ................... | G06Q 30/0251 705/14.45 |
| 2012/0096019 A1* | 4/2012 | Manickam | .......... | H04L 29/12641 707/767 |
| 2013/0086085 A1* | 4/2013 | Kato | ................ | G06Q 10/06312 707/749 |
| 2014/0143331 A1* | 5/2014 | Smith | ............... | H04L 29/12641 709/204 |
| 2015/0154294 A1* | 6/2015 | Kamdar | ................. | G06Q 30/06 707/709 |
| 2015/0156168 A1* | 6/2015 | McLaughlin | ......... | G06F 3/0482 707/767 |
| 2015/0215271 A1* | 7/2015 | Gupta | ................. | H04L 61/1511 707/722 |
| 2015/0347423 A1* | 12/2015 | Jheeta | ............... | G06F 16/90324 707/767 |
| 2016/0239899 A1* | 8/2016 | Kamdar | ............. | G06Q 30/0629 |
| 2016/0239900 A1* | 8/2016 | Kamdar | ................ | H04L 61/302 |
| 2016/0241510 A1* | 8/2016 | Kamdar | ................ | H04L 61/302 |
| 2017/0011445 A1* | 1/2017 | Reinsberg | .......... | G06Q 30/0203 |
| 2017/0011446 A1* | 1/2017 | Reinsberg | .......... | G06Q 30/0627 |
| 2017/0116685 A1* | 4/2017 | Hardjasa | .............. | G05B 13/027 |
| 2017/0206272 A1* | 7/2017 | Neela | .................... | G06F 16/337 |
| 2018/0107654 A1* | 4/2018 | Jung | ................... | G06F 40/268 |
| 2018/0211320 A1* | 7/2018 | Kamdar | ............. | G06F 16/3322 |
| 2019/0005404 A1* | 1/2019 | Zholudev | ........... | G06F 16/24578 |
| 2019/0005405 A1* | 1/2019 | Zholudev | ............ | G06N 20/00 |
| 2019/0122258 A1* | 4/2019 | Bramberger | ....... | G06Q 30/0248 |
| 2020/0210504 A1* | 7/2020 | Lai | .................... | G06F 16/24578 |

\* cited by examiner

File  Edit  Tools

Business Name Generation Dashboard

Please provide the following input to request a personalized or customized business name:

Personal or Business Name | Great Online Business

Industry Vertical: | eCommerce/Online Website ▽

Location: | Phoenix Arizona

Keywords: | Online, Business, Company

GENERATE BUSINESS NAMES FOR ME

FIG. 3

DATA-DRIVEN ONLINE BUSINESS NAME GENERATOR

FIELD OF THE INVENTION

The present invention generally relates to the field of business-related names, including business names, trademarks, logos, tag lines, domain names, social media handles, and/or any other names needed to successfully start and run a business, and specifically to the field of automatically generating, from data specific to a business, recommended names according to recognized naming patterns within existing business names.

SUMMARY OF THE INVENTION

Disclosed embodiments of the present invention provides systems and methods comprising a server specifically configured to: identify a business name within an aggregation of business names; tokenize the business name; match a resulting token to an industry related keyword; generate a template with placeholders replacing a prefix or a suffix appended to the token from a recognized pattern; identify a request to generate a name candidate, select a personalized data associated with the requesting user and an associated industry; and generate a list of name candidates, with the personalized data inserted into the placeholder; then determines the availability and ranks each name candidate in the list.

The above features and advantages of the present invention will be better understood from the following detailed description taken in conjunction with the accompanying drawings.

BRIEF DESCRIPTION OF THE DRAWINGS

FIG. 3 is a user interface illustrating a possible embodiment for recommending data-driven business-related names from previously recognized name patterns.

DETAILED DESCRIPTION

Figure 1:
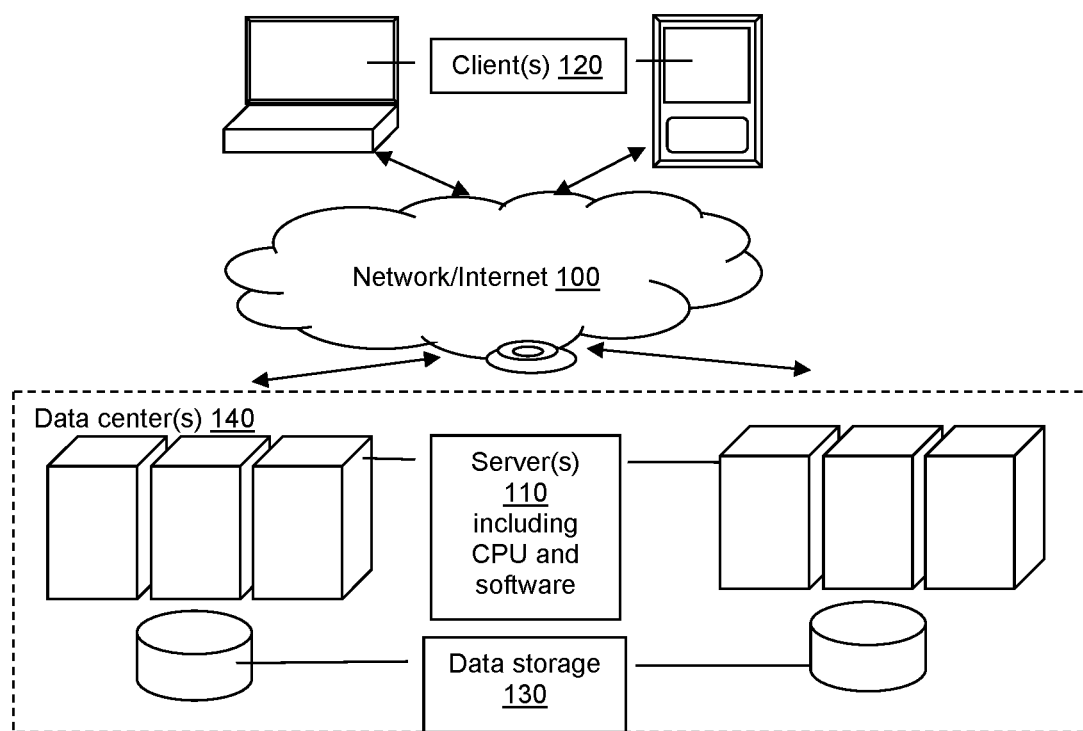
FIG. 1 illustrates a possible system for recommending data-driven business-related names from previously recognized name patterns.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Website browsers are able to locate specific websites because each website, resource, and computer on the Internet has a unique Internet Protocol (IP) address.

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name.

Given the utility of domain names in locating resources on the Internet, as well as their popularity among Internet users in locating specific website or other Internet resources, users, including businesses and individual users, may desire one or more domain names that allow other users to easily find and access the business' website or other online resources.

However, creating and maintaining a business requires much more than just a domain name. For example, businesses and business owners may want to register their business with the appropriate government agencies, or create a social media presence for the business. To this end, in addition to registering a domain name, businesses may desire to create a unique, recognizable, and memorable business name, trademark, branding name/trade dress (e.g., logo, tagline, etc.) in order to grow and run their business, as well as unique, recognizable and memorable social media handles to be found online, or any other necessary name-based resources.

However, the business or individual may lack knowledge about the best way to generate such names. For example, the business or individual may not know available naming options, or have a clear understanding of industry trends for generating such business names, trademarks, brand names/ trade dress (e.g., logos, tag lines, etc.), domain names, social media handles, etc. (referred to herein as "names"). To overcome this lack, the business or customer may hire a branding company or a consulting service, made up of human experts, who may then use current business or online presence naming conventions to generate and recommend names. These existing solutions may be expensive and time consuming, and like the business or individual, may also be limited in their own individual capacities. These services may also be limited to business names, leaving the business or individual without means to acquire additional names, such as logos, taglines, trademarks, domain names, social handles, etc.

Instead of hiring human consultants, the business or individual may attempt to search online resources for generating names. However, these online name generation resources do not generate names specific to the business or individual. For example, these automated services only append a generic string (e.g., "corporate," "business," "online," etc.) to a keyword in a user's query, with subsequent query results including the same generic strings. They also may lack the unique features of the embodiments disclosed herein, such as providing query results specifically relevant to the customer's intent for their business, and ranking the results in a specific and particular order.

To overcome the lack within the current state of the art, the disclosed embodiments provide businesses or individual users with an alternative solution for recommending names. The disclosed embodiments include a system executing method steps to automatically generate relevant and personalized names by inserting specific data about the business (e.g., within a profile or as provided by the user) into one or more templates generated from existing business name patterns.

To accomplish this, the system first aggregates business name data from a plurality of resources, which may include generally-accessible and/or proprietary sources specific to a services provider (e.g., token dictionaries, data synonym dictionaries, GODADDY'S Go Central, My Account, Website Builder, Categorization API, Domain Find, Deep Spin, etc.), one or more zone files, one or more domain name search logs, one or more domain name suggestion algorithms, and one or more third party business data directories (e.g., DUNN & BRADSTREET). The system then identifies, within the aggregated data, one or more business names and/or one or more Uniform Resource Locators (URLs) for one or more websites. In some embodiments, the system then crawls the identified websites to extract additional business name data, possibly from the title or description tags within the crawled websites.

The system then performs online and/or offline processing that analyzes the business name data within the aggregated data to identify business names and the business naming patterns used to generate the existing business names. This online and/or offline processing may include data mining, which may further include generating a proprietary ontology for the business names, possibly helping to associate keywords with a specific industry vertical. Generating the ontology may include tokenizing and identifying parts of speech for each token in the business name, possibly by comparing substrings within each business name string with tokens and parts of speech in electronic dictionaries containing identified tokens and parts of speech respectively.

Using this aggregated data and the established ontology, the disclosed embodiments then apply data mining techniques to identify keywords and analyze the aggregated data to identify and learn naming patterns and trends from existing businesses or business-related names. In some embodiments, these trends are analyzed across different industries/verticals. From these naming patterns, the disclosed embodiments generate one or more templates, possibly for specific industries. These templates include one or more placeholder values for a business name, location, industry, related keywords, etc. The system then stores the naming patterns and templates within an electronic dictionary, possibly grouped according to the associated industry for each business name.

The system then identifies business name, location, industry, or keyword data associated with the business or user, possibly from an electronic profile, the resources, libraries, and/or directories noted above, and/or data received by the user from a graphical user interface (GUI), and fills the placeholder values within the appropriate templates (e.g., in the business' industry) with the relevant business data, in order to generate one or more recommended names for the business.

The system can then customize the generated recommended name(s) for the business, making the generated names unique. To accomplish this, the system further analyzes the naming patterns to identify keywords and names that are not in any electronic dictionary. The system may then creatively generate one or more new names, based on the identified naming patterns.

The system then displays the generated recommended names to the user, which may include metrics and reasons for the recommended names, which may help the users to evaluate the names. In some embodiments, these recommended names are ranked according to the most relevant names, and displayed in this order.

The disclosed embodiments represent at least five improvements that help to streamline the name generation industry, as well improving the technological environments in which name generation may be executed. First, the disclosed system provides a personalized do-it-yourself experience tailored to the user's input and other data, such as a business' name, location, industry, and preferred keywords. Second, the disclosed system generates the naming patterns from good quality in-house data sources. Third, the system uses creative human-advised naming strategies to generate the names. Fourth, the system uses successful machine learning and deep learning recommendation models tested on domain names and tuned for naming suggestions, and fifth, the disclosed system represents a one-stop experience to provide not only business names, but also domain names, social handles, etc., and performs necessary availability checks. The disclosed embodiments, therefore, automate and streamline that whole process that usually takes a lot of time.

Thus, the disclosed system recognizes naming patterns within existing names, and from these naming patterns, determines how to generate meaningful name recommendations based on business or other received user data, and possibly a related industry.

Several different environments may be used to accomplish the method steps of embodiments disclosed herein. FIG. 1 demonstrates a streamlined example and FIG. 2 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 110 and/or client 120, and executing instructions stored (perhaps as scripts and/or software, possibly as software modules/ components) in computer-readable media accessible to the CPU, such as a hard disk drive on a server 110 and/or client 120.

The example embodiments shown and described herein exist within the framework of a network 100 and should not limit possible network configuration or connectivity. Such a network 100 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 110 and at least one client 120 may be communicatively coupled to the network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution that may have occasion to organize/import contacts and/or send marketing campaigns.

Server(s) 110 may comprise any computer or program that provides services to other computers, programs, or users either in the same computer or over a computer network 100. As non-limiting examples, the server 110 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 120.

The server 110 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 120 may be any computer or program that provides services to other computers, programs, or users either in the same computer or over a computer network 100. As non-limiting examples, the client 120 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 120. Non limiting example programming environments for client applications may include JavaScript/AJAX (client side automation), ASP, JSP, Ruby on Rails, Python's Django, PHP, HTML pages or rich media like Flash, Flex or Silverlight.

The client(s) 120 that may be used to connect to the network 100 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 120 or the server(s) 110 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 110 may be communicatively coupled to data storage 130 including any information requested or required by the system and/or described herein. The data storage 130 may be any computer components, devices, and/or recording media that may retain digital data used for computing for some interval of time. The storage may be capable of retaining stored content for any data required, on a single machine or in a cluster of computers over the network 100, in separate memory areas of the same machine such as different hard drives, or in separate partitions within the same hard drive, such as a database partition.

Non-limiting examples of the data storage 130 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 130 may comprise any collection of data. As non-limiting examples, the data storage 130 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 110 or software modules within the server(s) 110 may use query languages such as MSSQL or MySQL to retrieve the content from the data storage 130. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 110. As non-limiting examples of such software, the paragraphs below describe in detail the software modules/components that make up the software combination. These software modules/components may comprise software and/or scripts containing instructions that, when executed by a microprocessor on a server 110 or client 120, cause the microprocessor to accomplish the purpose of the module/component as described in detail herein. The software combination may also share information, including data from data sources and/or variables used in various algorithms executed on the servers 110 and/or clients 120 within the system, between each module/component of the software combination as needed.

A data center 140 may provide hosting services for the software combination, or any related hosted website including, but not limited to hosting one or more computers or servers in a data center 140 as well as providing the general infrastructure necessary to offer hosting services to Internet users including hardware, software, Internet web sites, hosting servers, and electronic communication means necessary to connect multiple computers and/or servers to the Internet or any other network 100.

Figure 2:
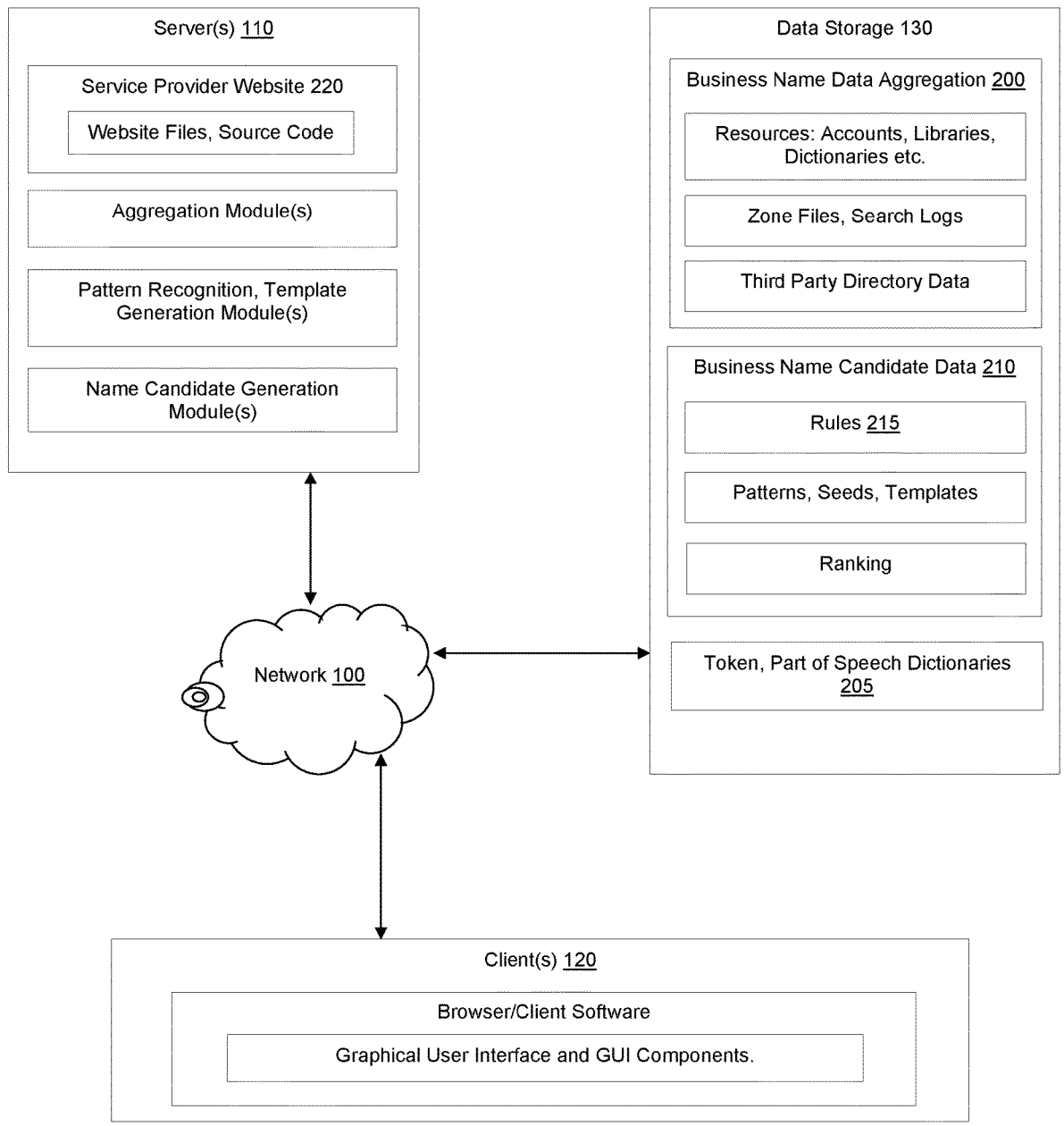
FIG. 2 illustrates a more detailed possible system for recommending data-driven business-related names from previously recognized name patterns.

FIG. 2 shows a more detailed example embodiment of an environment for the systems, and for accomplishing the method steps, disclosed herein. As non-limiting examples, all disclosed software modules may run on one or more server(s) 110 and may include one or more user interfaces generated by the server(s) 110 and transmitted to and displayed on the client(s) 120. The user interface(s) may be configured to receive input from the user and transmit this input to the server(s) 110 for the administration and execution of the software 200, using data in data storage 130 associated with the software modules 200. Thus, the disclosed system may be configured to execute any or all of the method steps disclosed herein.

Server(s) 110 may be hosted by any entity, possibly a hosting provider, a domain name registrar, a website development company, any other software service provider or any combination thereof. To manage users of such a system, including individuals or organizations, server(s) 110 may host and run a user administration program 210 such as GoDaddy's My Account control panel for management of hosting and domain names, as a non-limiting example.

In such an administration control panel program, or admin 210, each user may be assigned a user id. This user id may identify transactions performed by each user, or other data, such as authentication information disclosed herein. These transactions, authentication data and/or other data may be stored as data records in data storage 130, each data record including the user id to associate the user with the transaction in data storage 130.

Thus, the disclosed system may be made up of a combination of hardware and software. In some embodiments, the software may include instructions, customized to perform the method steps described herein, stored and executed in a memory and executed by one or more processors within server 110 and/or client 120, which may be coupled to the memory. This combination of hardware or software, or any other architecture features needed to execute the method steps disclosed herein, are referred to herein as the system.

As noted above, the disclosed embodiments utilize a data-driven approach to provide businesses and/or other users with means to explore and brainstorm ideas for generating names for their business. The first step in this data driven approach is to aggregate the data from one or more sources. These sources may include, as non-limiting examples: resources, libraries, and/or dictionaries which are generally available, or which are specific to a services provider (e.g., token dictionaries, data synonym dictionaries, GODADDY'S Go Central, My Account, Website Builder, Categorization API, Domain Find, Deep Spin, etc.); one or more zone files; one or more domain name search logs; one or more domain name suggestion algorithms; one or more third party business data directories (e.g., DUNN & BRADSTREET); and/or any other known resource for identifying business names and websites associated with these businesses. The system may then identify, within the aggregated data, one or more business names and/or one or more Uniform Resource Locators (URLs) for one or more business-related websites. In some embodiments, the system then crawls the identified websites to extract additional business name data, possibly from the title or description tags within the crawled websites.

The system may aggregate data from one or more user accounts associated with one or more businesses (e.g., administrator accounts) in order to identify the business names associated with the accounts. Such administrator accounts may include data retrieved from one or more data entry forms presented to each user via a GUI. As non-limiting examples, this data entry may include a name of the business and/or user/administrator, a business category associated with the business, a description of the business or user, possibly including a website description, contact data, such as an email address, physical business or individual address (including street address, city, county, state, country, etc.), an account username, any other notes, tags, or other metadata associated with the business or account administrator, etc.

In some embodiments, the system may have access to one or more zone files listing one or more registered domain names, as well as one or more domain name search logs, which keep a record of domain names searched by users. The system may use these zone files and/or search logs to identify business names, as well as business-related websites to crawl in order to identify additional business names, as described in more detail herein.

In some embodiments, the system may have access to one or more third party business directory companies. These third party companies may provide a listing of businesses (effectively an electronic version of white or yellow pages for businesses), including their business names, and possibly a URL for each of the listed businesses, allowing customers to access their business websites.

The system may then identify business names from the aggregated data, possibly using the resources described above, and store the business names within a business name data aggregation 200 and/or business name candidate data 210 (possibly stored in data store 130, or utilized within the disclosed algorithms executing the method steps herein) for additional analysis and data mining, described in detail below.

To augment the number of available business names to be analyzed, the system may analyze the zone files, domain name search logs, and third party directories to identify URLs that identify specific websites, such as websites resolving from domain names identified within the zone files, domain name searches in the domain name search logs, third party directories, etc.

The system may then crawl each of the websites identified from the URLs and identify, within each website, the business name associated with the crawled website. As non-limiting examples, in some embodiments, the system may identify the title and description data from the website, possibly from title and description data within the title and description tags within the website's HTML, and identify the business name within the title or description data. The system may then store the business names, possibly in association with the business, URL, HTML tags, etc., within the business name data aggregation 200 for additional analysis and data mining, described in detail below.

Before identifying the patterns within the aggregated business names, the system may perform online or offline text pre-processing on the strings that make up the identified business names. This text pre-processing may include any steps to prepare the text to be analyzed in order to identify the patterns that make up the business or company name. As non-limiting examples, this analysis may include splitting sentences, tokenizing the character strings, and tagging parts of speech identified within the character strings.

To tag parts of speech for the tokens identified within the business names, the system may access one or more parts of speech (POS) dictionaries 205 defining one or more parts of speech associated with each of the tokens within the business names stored in the business name data aggregation 200. In one non-limiting example, the system may identify a business name "Joes Best Sunnyvale Pizza." After tokenizing the phrase, the system may access the POS dictionary 205, and match the token "pizza" extracted from the business name, with a token "pizza" in the POS dictionary 205, and associated in the POS dictionary with a label or tag "noun." Similarly, the system may identify the token "best" in the business name, and match it to a token "best" within the POS dictionary 205 associated with a label or tag "adjective." The system may tokenize "Sunnyvale" and match it to a token in the POS dictionary 205 associated with a label or tag "proper noun" and/or "adjective," and so forth. The system may then update the business name data aggregation 200 with labels or tags for each identified token.

In some embodiments, the system may then use the pre-processed tokens within each aggregated business name to identify a specific business category or industry (referred to herein as an industry vertical), and map each of the aggregated business names to a specific industry vertical, then store an industry vertical label or tag in association with each business name stored in the business name data aggregation 200 and/or business name candidate data 210. In some embodiments, this model may be extended, so that the system may use the pre-processed tokens within each aggregated business name to create keyword-based name patterns.

The system may analyze each aggregated business name to consistently map each aggregated business name to an industry. Specifically, even if the internal or external data sources had already mapped a given business name to a specific industry, this mapping may be incompatible with the industry name encoding required by the disclosed system. In other words, even if each aggregated business name is already mapped to an industry vertical, the industry name encoding may lack reference points that allow the system to map each of the identified business names to a business vertical identified within the system.

The system may overcome this issue by establishing a standard industry ontology for the business names. Generating the ontology may include tokenizing and identifying parts of speech for each token in each business name, possibly by comparing substrings within each business name string with tokens and parts of speech labels or tags in electronic dictionaries containing identified tokens and parts of speech respectively.

In order to establish, generate, maintain and/or store such a standard or baseline industry ontology, the system may reference one or more of the resources described above, to identify one or more tokens within the resources, libraries, and/or dictionaries, and may apply text pre-processing techniques similar to those described above.

The system may then compare each of the tokens identified within each of the aggregated business names with keywords identified within these resources, libraries, and/or dictionaries that are specific to a particular industry and are identified over time as being specific to that industry. The system may then assign an industry vertical to each of the aggregated business names, and store these assigned industry verticals, possibly as labels or tags mapping each aggregated business name to a specific industry within business name data aggregation 200 and/or business name candidate data 210.

After mapping an industry vertical to each of the aggregated business names, the system may execute one or more data cleaning procedures configured to clean the aggregated business data, in order to avoid irrelevant or low quality data (e.g., data from large entity businesses, or inactive system users), and keep only valuable data within the business name data aggregation 200 or business name candidate data 210, for identifying industry-related company name patterns, as described herein.

For example, the aggregated business names may include personal names or locations, which the system may replace with lexical tokens, available from the resources, libraries, and/or dictionaries described above, in order to normalize the naming patterns, described in more detail below. The system may also remove extraneous tokens or character strings. For example, for a business titled "Jenny's Homemade Bakery Co," the system may remove the legal term "Co." (or "LLC" and "PLLC," for example) leaving only "Jenny's Homemade Bakery" as the business name. The disclosed system may iteratively apply the data cleaning steps described above until frequently used irrelevant or low quality data patterns are identified and removed.

The system then performs online and/or offline processing that analyzes the business names and associated data within the business name data aggregation 200 to identify business naming patterns used in generating the aggregated business names, then stores the results of the analysis as business name candidate data 210.

Many business names (possibly within a specific industry vertical) have a same specific naming pattern. The system may analyze the aggregated data to identify such business naming patterns and trends within the aggregated business names. Using a modification of the non-limiting example above, the business name "Joe's Sunnyvale Pizza" includes three tokens: Joe's, Sunnyvale, and Pizza. Using the method steps described herein, the system may therefore determine that this business was created using the naming pattern of two prefixes, <namebase>, and <location>, appended to the token "Pizza."

In some embodiments, the business naming patterns are identified using human-advised strategies, such as patterns identified by business product managers using statistical methods to identify frequent business naming patterns and trends. In some embodiments, the human advised strategies (or machine learning algorithms described below) may be used to establish and input into the system a plurality of rules 215 for analyzing existing business names and identifying the patterns of tokens used within, or used to generate one or more recommended business names. In some embodiments the business names, naming patterns, and/or input of the plurality of rules 215 may be accomplished by machine learning techniques, described in more detail below. The system may then aggregate and use the established rules 215 to automatically discover patterns for business names, possibly specific to certain identified industry verticals, and identify the most popular patterns.

In embodiments where the system uses machine learning to analyze aggregated business names and learn naming patterns and trends from these existing names, proprietary machine learning algorithms may be used. The machine learning algorithms identify the patterns of names within the resources and data dictionaries referred to above, analyze the naming patterns, and aggregate them. These proprietary machine learning methods may represent an improvement over the prior art because they are more capable of creating name recommendations that don't already exist but still follow the style of the human-advised strategies for naming a business.

As a non-limiting example, in addition to naming patterns generated using automated statistics methods similar to those in the human-advised strategies disclosed above, the system may implement a paragraph summarization model using deep learning name pattern techniques. The system may use the data from the resources, libraries, and/or dictionaries described above as training data for the machine learning algorithms. The input to the neural network may include a sentence or paragraph describing the business, and the output may be the business name or domain name of this business.

In some embodiments, the determination of the most popular name patterns and trends is broken down according to associated industry verticals. Thus, once a clean data mining set is obtained, the system may identify the most popular naming patterns across industry verticals. In these embodiments, the rules may identify token patterns within each industry vertical. Continuing the example above, many restaurants within the pizza restaurant industry vertical may follow the same specific pattern—Joe's Sunnyvale Pizza follows the pattern <namebase> <location> and "pizza." In other words, while generating names as described in more detail below, the system may follow identified industry vertical-based naming strategies when creating naming templates for each industry, by tracking the number of prefixes or suffixes within the business naming pattern that occur before or after the keyword within the business naming pattern.

The system may then use the identified name patterns derived from existing business names to generate one or more seeds and/or templates, used to recommend the requested names to users for their business or organization. Seeds and/or templates may be name patterns generated and suggested from existing business names, according to common name patterns (possibly within an industry), and ordered by the frequency of each of the name patterns. The example <namebase> <location>"pizza" above may be a seed.

Seed patterns may be unique. In some embodiments, pattern types under "seed" may be marked by a 4 digit vector noting the number of name words, number of location words, number of preposition words, number of other words, etc. For example, a pattern <namebase> <location>"pizza" will be encoded as 1101, and the tokens with "< >" may be replaced by information specific to the user when returned.

The system may then generate a template from the seed and/or the previously identified naming patterns. Templates may include name patterns discovered from aggregated business names, but that are also statistically significant, and that are more generalized patterns compared to the seed from which they are generated. In some embodiments, the template may include a keyword (e.g., "pizza") and one or more placeholder values before and/or after the identified keyword, which the system, as described in more detail below, will fill in using data specific to, or provided by, the user.

Template patterns may include any number (e.g., 1-3) of placeholder values, as prefixes or suffixes, appended to the keyword. For example, a template may include a keyword identified as a noun (e.g., "pizza") and one or more prefixes and/or a suffixes (e.g., <placeholder> pizza <placeholder>) as a pattern before or after the noun keyword respectively. In some embodiments, the placeholder value may be filled with a prefix or suffix, possibly an industry-vertical specific prefix or suffix, pairing one or more words to the identified keyword. For example, a pattern "<placeholder> studio" may be encoded within the system as "prefix_1", meaning that this is a prefix pattern with length equal to 1.

Once the system has generated all business names, rules 215, business naming patterns, and/or seeds/templates, the system may rank the patterns according to the most relevant keywords, possibly according to industry vertical. To determine the most relevant keywords, the system may execute one or more Term Frequency (TF) and/or Inverse Document Frequency (IDF) algorithms.

The system may determine the relevance of the keywords within the business name patterns or trends according to one or more token scoring software algorithms. The system may calculate and assign a score to each token and/or each of the token's characteristics or features, using any technique known for scoring tokens or their characteristics or features, including the methods described herein. Once calculated, the system may store the score, in association with its associated token and/or token characteristics or features, within the business name candidate data 210.

The system may then update the keyword's score of characteristics and features according to the TF technique, including a term analysis and a determination of frequency of the token (or related concepts) within the business name data aggregation 200. To accomplish this, the system may analyze any collection of the business name data aggregation 200 and, after identifying the tokens within the associated character strings, may determine the total number of appearances of that token within each instance of the analyzed data.

For example, for the token "pizza," the system may analyze 100 separate business names, and determine how many times the term "pizza" appears in each of the 100 business names. If the term "pizza" appears frequently in the business names, it would receive a higher score, and would receive a lower score if it appeared less frequently.

The system may also update the keyword's score of characteristics and features according to the IDF technique, which may include a term analysis, specifically a determination of how many of the total business names identified within the aggregation include the identified token; in other words, a determination of how many of the business names contain the token or term.

Continuing the example above, for the token "pizza" the system may analyze 100 separate business names, and determine how many of them include the token "pizza." If two of the business names include the word "pizza," a score of 2 would result.

In some embodiments, Pointwise Mutual Information (PMI) may be used as another treatment to identify category words. In some embodiments, this model may be extended, so that the system may use the identified tokens within each aggregated business name to create keyword-based name patterns. Such PMI may be any PMI algorithms known in the art, such as a measure of association used in information theory and statistics, which pairs outcomes belonging to discrete random variables and quantifies the discrepancy between the probability of their coincidence given their joint distribution and their individual distributions, assuming independence. Such PMI may be used for finding collocations and associations between words, such as countings of occurrences and co-occurrences of words in a text corpus.

Thus, the disclosed embodiments may run TF-IDF/PMI steps in order to identify high relevance words, then by looking at the POS tag of the word, can generate dictionaries including popular vertical nouns, adjectives, verbs and more. These dictionaries are used in more creative naming strategies, as will be described below. As above, once category-based name patterns are generated, the disclosed embodiments then reorganize the patterns by keywords. To ensure the quality of keyword based name patterns, the disclosed embodiments apply category word TF/IDF, PMI and other language models to help identify the importance of each word in a keywords string, and give a final score after evaluating the relevance of name patterns to the entire keywords string.

The system may then store the business names, the business name patterns, the seeds and/or templates, according to a rank and/or score given to the keywords generally or within a specific industry, within the business name candidate data 210, possibly as one or more business name data dictionaries of mined and analyzed business name data. In some embodiments, the generated and stored business name data dictionaries may include the POS tag of the keywords, which the system may use to generate dictionaries including popular vertical nouns, adjectives, verbs and more. These dictionaries are used in more creative naming strategies described below.

Once the business name candidate data 210 described above is generated and stored, users may query this data and request one or more business-related names for their business. To accomplish this, the user may access a GUI for requesting suggested business names, such as that seen in FIG. 3. The system may then utilize business name candidate data 210 and/or business name data aggregation 200 to generate and recommend one or more names to the user.

As described above, the system may analyze the data within one or more proprietary resources, libraries and/or dictionaries within a collection of business profile data available to the service provider, and identify data to insert into the placeholder values within the templates stored in the dictionaries (e.g., Joe's and Sunnyvale, to fill the <namebase> and <location> placeholder values respectively before "pizza" in the example above). Using the data generated for the dictionary from the data mining and machine learning described above, the system then identifies the user's name, business name, industry vertical, either from the aggregated data within the generated dictionaries, or the user input data described above, and generates one or more business name candidates.

However, when the system is unable to detect and identify the data needed to generate a business name, the user may utilize a GUI such as that demonstrated in FIG. 3, to input one or more business or user related data. As seen in FIG. 3, the GUI may allow users to input, as non-limiting examples, the user's business or personal name, an industry vertical associated with the business, a location of the business, preferred keywords associated with the business, and so forth. The system may receive and analyze this input data at query time, via the GUI. The system may then use this input to identify specific data to be inserted into the appropriate placeholder values within the template, which may then be used to generate and recommend business names to the user.

In order to generate the business name candidates, the system may access the preprocessed data within the business name candidate data 210, or any other associated available resources, libraries, or dictionaries described above, and select any patterns relevant to the user (e.g., according to all patterns for an identified industry vertical, described below).

The system may then select the templates relevant to the user and/or the industry vertical and, according to the rules established above for generating recommended business names, may fill in as many placeholder values as possible, according to available data within the business name data aggregation 200 or the business name candidate data 210, and using proprietary machine learning algorithms disclosed herein.

For placeholder values within each template that the system is unable to fill using the proprietary machine learning algorithms, the business name data aggregation 200, the business name candidate data 210, or any other available resources, the system may supplement the user input from the GUI. Thus, the system may use any combination of the available resources or the user input to replace the appropriate placeholder values within the available templates, according to the rules defined within the system from the aggregated business names.

In some embodiments, the input provided by the user from the GUI may take precedence over the data identified by the system from the business name candidate data 210 and/or the business name data aggregation 200 when filling in the placeholder values within the template. In some embodiments, the input may be weighted, so that the keywords are the most important input, for example.

The system may then generate one or more recommended names, using the templates filled with the data personalized to the business or the user, according to the proprietary machine learning algorithms. In some embodiments, the system may further modify the original form of business names, as described in detail below.

In some embodiments, the system may provide even more unique and personalized recommended business names by applying unique and additional creative variations to the generated name candidates. These creative variations may use keywords and other popular words to generate unique business name recommendations at service time. The system may continue to apply the creative variations described herein to continue to generate name candidates until a sufficiently abstract and unique name is found.

The algorithms used to generate these unique and personalized name candidates may transform existing recommended names by identifying, from business names stored in the business name data aggregation 200, any combination of words (or portions of words) used to create the new and unique business name. The algorithms may use these combinations of tokens that occur frequently, possibly within specific and relevant industry vertical categories, and follow specific rules, as are outlined below (adjective-noun, alliteration, rhyme, amalgam, etc.), to generate recommended or suggested names that are typically not found within known dictionaries.

A first creative variation may include generating business names by combining tokens of appropriate parts of speech, such as combining an adjective and a noun, as a non-limiting example, where the noun follows the adjective. A non-limiting example of such a combination may include Legal-Care, which is derived from combining the adjective legal with the noun care.

Another creative variation may include generating business names using alliteration, which combines two or more tokens that have the same phonetic or letter sound at the beginning of each of the two or more words. Non-limiting examples of such combinations may include Best Buy, Dunkin Donuts, LifeLock, and PayPal, where the phonetic sound or the letters at the beginning of the words is the same.

Another creative variation may include generating business names by using rhyme, which combines two or more tokens that have the same phonetic or letter sound at the end of each of the two or more words. Non-limiting examples of such combinations may include Laffy Taffy, Reese's Pieces, Dubble Bubble, and Mello Yello, where the phonetic sound or the letters at the end of the words is the same.

Another creative variation may include generating business names by combining two or more semantically similar words connected to each other by a conjunction word ("and," "&," "plus," dashes/hyphens, etc.). Non-limiting examples of such combinations may include Gold&Cash, which is a combination of gold+cash.

Another creative variation may include generating business names by using personification, which combines one or more tokens with category specific nouns. In some embodiments, this model may be extended, so that the system may use the identified tokens within each aggregated business name to create keyword-based name patterns. Non-limiting examples of such combinations may include Mr. Clean, Miss Manners, or any combination with words such as Mr., Ms. Guru, etc. (e.g., Mr. Health, Mr. Plumber, Mr. Guru), combining keywords with category specific nouns, or keyword-based name patterns.

Another creative variation may include generating business names by using an amalgam, which creates a hybrid combining two semantically similar words. In some embodiments, these amalgam names may combine tokens or portions of tokens in order to create new terms that don't exist in a standard language or within a known dictionary of standard languages. Non-limiting examples of such combinations may include Microsoft and Pinterest, creating a hybrid combining two semantically similar words (microcomputer and software, and pin and interest respectively).

Another creative variation may include generating business names by creating non-traditional additional suffixes to an identified keyword. In some embodiments, these "cute suffix" names may combine identified tokens or portions of tokens with the non-traditional suffix in order to create new terms that don't exist in a standard language or within a known dictionary of standard languages. Non-limiting examples of such combinations may include Shopify and Swiftly, creating a hybrid combining a keyword or a portion of a keyword with a suffix ("shop" with "-ify" and "swift" with "-ly" respectively).

The examples above for generating one or more business names using creative variations are non-limiting, and any means of generating suggested names known in the art may be used. As non-limiting examples, the system may generate names using real words, compounds, phrases, blends, tweaked words, initials, acronyms, affixed words, specific business product names, etc., or any combination thereof (e.g., AirBnB—a combination of air and an acronym for bed and breakfast).

As demonstrated in the examples above, the creative variations for replacing placeholder values in templates may include non-dictionary names (e.g., Pinterest, Airbnb) according to names, name patterns, or words that are not in the dictionary, which may be extracted and modified according to the data in the aggregated data.

In some embodiments, the system may apply an algorithm that follows any of the adjective-noun, alliteration, rhyme, or descriptive component rules set forth above. However, where the combination of tokens is longer than 10 characters, the system may leave the element words apart.

As noted throughout the description of the disclosed embodiments herein, in some embodiments, the system may identify an industry vertical specific to the user or business that requests the business name. In some embodiments, the system may use the industry vertical input into the GUI to determine the industry vertical to which this business belongs. In some embodiments, the system does not receive an input (i.e., the GUI component for identifying the industry vertical is empty), so the system is unable to match the user's data to a specific existing industry vertical. In these embodiments, the system may access the system resources, libraries, and/or dictionaries described above to identify an associated industry vertical and assign it to the user query. The system may then identify all patterns and templates for the identified industry vertical, and generate the business name candidates using appropriate keywords, patterns, and templates associated in the business name candidate data with the identified industry vertical.

To further augment the available business name candidates and avoid recommending names that are already taken, the system may utilize the identified name patterns, templates, and/or business name candidates as input within a remote procedure request sent to an internal spin API (e.g., GODADDY DEEPSPIN) in order to generate a slightly modified version of the original patterns, and to generate a new set of business name candidates.

Once the system has generated all name candidates in response to the request, it may generate scores for the candidates and rank them according to proprietary algorithms, where names with the highest scores are ranked highest. The ranking function may be a standard machine learning ranking function that presumes the existence of data to train on.

Initially, ranking may be made according to a score, which is used to rank generated name suggestion candidates accordingly. The algorithms for generating the score may include groupings according to "type of strategy," then within each type, there are linear ranking functions to give a score that consider number of words in name, token relevance to vertical and input keywords. The scores may be calculated initially using the results of the recommended names, until the system is provided with enough data to train a machine-learned model, using a standard machine learning ranking function.

The system may then use an online availability checker software to conduct a check on the final list of name candidates to provide availability information and return the suggestions back to the user.

In one example embodiment, the system may access databases or any other online resources (e.g., state records of business registrations) to determine the availabilities of business registrations, according to any method known in the art for determining the availability of registered business names. The system may then filter out generated business names that are not available to be registered.

In another example embodiment, the system may access databases or other online resources to determine the availabilities of domain name registrations, according to any method known in the art for determining the availability of a domain name for registration. To accomplish this, the system may access the appropriate domain name resources (e.g., domain name zone files) to perform a domain name availability check. The system may then filter out generated domain names that are not available to be registered.

In other non-limiting example embodiments, the system may access databases or other online resources to determine the availabilities of social media handles, according to any method for determining the availability of social media handles known in the art. Examples of such social media handles may include any username or other social media handle for Facebook, Yelp, Instagram, etc. In some embodiments, an API (e.g., ONEAPI) may be used to determine if the social media handles are available, and may import those that are available.

In other non-limiting example embodiments, the system may access databases or other online resources to determine the availabilities of trademarks, according to any method for determining the availability of a trademarks known in the art. The system may then filter out generated trademarks that are not available to be registered.

In some embodiments, once the system has determined the availability of the business name, branding names/trade dress (e.g., trademark, logo, tagline, etc.), the domain name, and/or social media handles, it may use API calls or other technology to automatically register the identified names.

The system may then execute one or more online availability software modules to determine if all names in the final list of names are available. Using the ranked and available names, the system may create an ordered list of the names, with the highest scoring name at the top of the list. Using this list, the system may generate one or more components within a GUI (e.g., FIG. 4) listing the generated names to provide availability information and return the name candidates to the customer, and may include recommendations and metrics used in generating and ranking the finalized list of name candidates.

Figure 4:
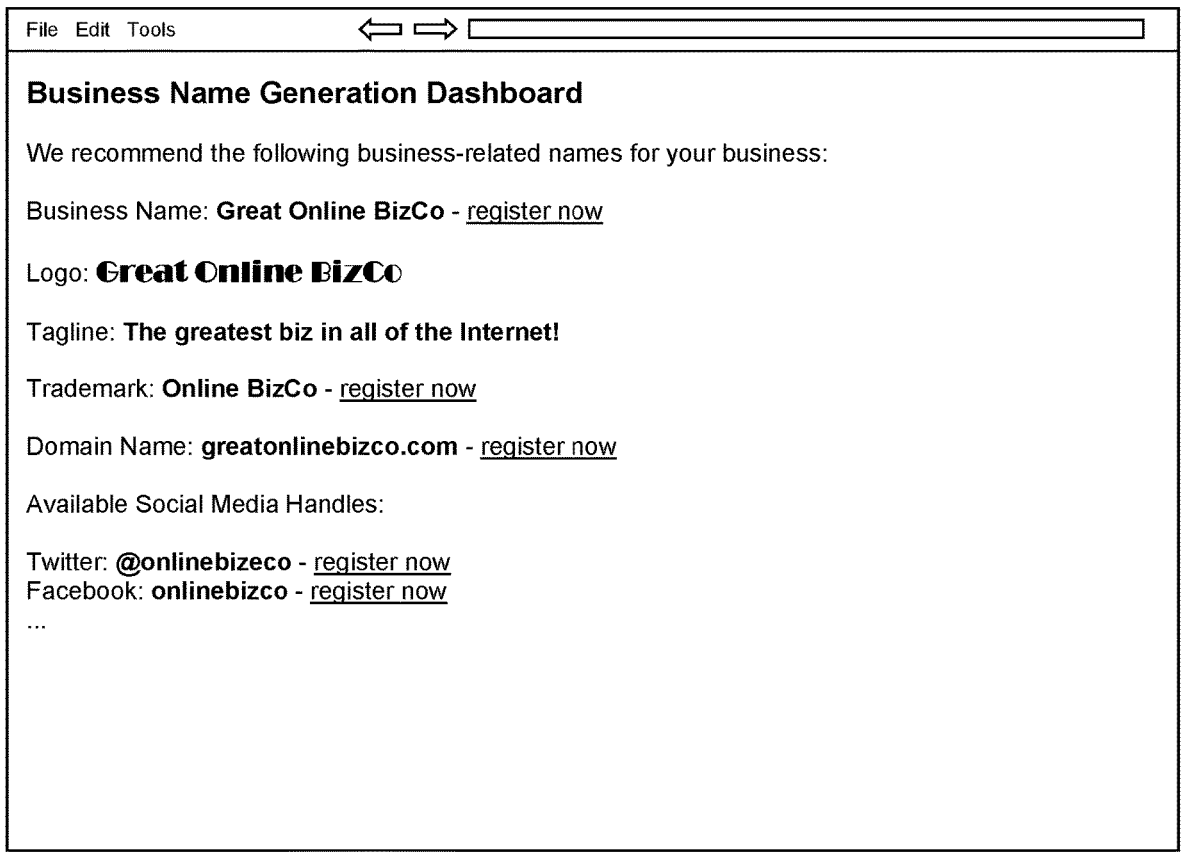
FIG. 4 is a user interface illustrating a possible embodiment for recommending data-driven business-related names from previously recognized name patterns.

In some embodiments, not shown in FIG. 4, the finalized list of names may be ranked according to the ranking algorithms disclosed above with the highest scored name listed first, and the lowest scored name listed last. The GUI component may then be transmitted through the network for display on the GUI on the user's client device 220, and the user may select one or more desired names for registration. The software within the disclosed system may then register any names not previously automatically registered by the system.

The machine learning model may improve over time as new data is received. Initially, the machine learning model may rank names, possibly according to a revenue fee, but once the system begins receiving and collecting feedback from responses received after presenting names to users (e.g., click data), the system may determine the parameters on which the names were selected. The system may then measure the conversion rate for different types of spin, for different type of names they suggested (e.g., the creative variations above), and so forth, and may use this data to rank subsequent name lists accordingly, and improve the model over time.

Figure 5:
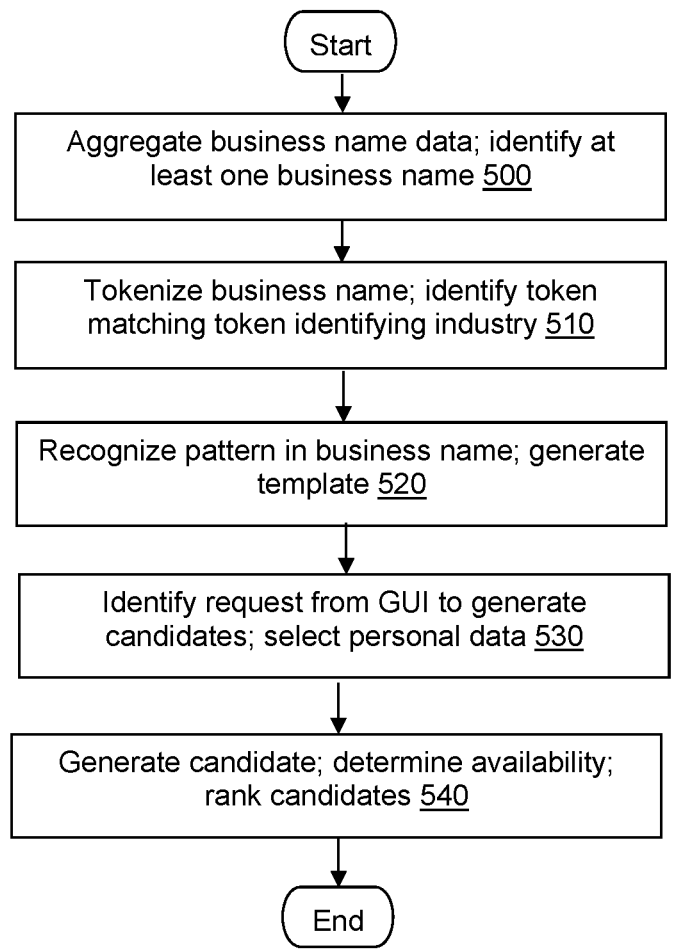
FIG. 5 is a flow diagram illustrating the method steps for a possible embodiment of a method for recommending data-driven business-related names from previously recognized name patterns.

Thus, in summary, and as seen in FIG. 5, the disclosed system and associated method steps may include a server, comprising device coupled to a network and including at least one processor executing custom designed special purpose computing instructions within a memory coupled to the server which, when executed, cause the system to: aggregate a plurality of business name data and identify, within the business name data, at least one business name (Step 500);

The system then tokenizes the at least one business name, identifying, within the business name, at least one token, and matches a first token within the at least one token in the business name to a keyword identifying an industry associated with the business name (Step 510).

The system then recognizes a pattern within the business name comprising at least one additional token appended as a prefix or a suffix to the first token, and generates a template comprising the first token and at least one placeholder value replacing the at least one additional token (Step 520).

The system then identifies, within a user input into a graphical user interface (GUI), a request to generate at least one name candidate, and selects a personalized data associated with a user that input the user input into the GUI, and the industry associated with the user (Step 530).

The system then generates the at least one name candidate comprising the personalized data inserted into the placeholder value of the template as the prefix or the suffix of the first token, determines the availability of the at least one name candidate; and ranks the at least one name candidate (Step 540).

The steps included in the embodiments illustrated and described in relation to FIGS. 1-5 are not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system comprising:
 a server, comprising at least one processor executing instructions stored within a non-transient computer memory coupled to the server that, when executing the instructions, is programmed to:

generate data mining set from a plurality of resources, wherein the data mining set comprises business data for a plurality of existing businesses across a plurality of industry verticals;

utilize a trained machine learning model to process the data mining set to identify a plurality of naming patterns for each industry vertical of the plurality of industry verticals;

generate a plurality of naming seed templates for each industry based on the plurality of naming patterns for each industry vertical of the plurality of industry verticals;

re-organize the plurality of naming seed templates at least by industry vertical-important keywords based on at least one token scoring technique to form a business name candidate data;

receive, from a computing device associated with a user, a request to generate at least one particular business naming candidate for a particular business associated with a user;

wherein the request comprises personalized business data describing the particular business;

tokenize the personalized business data to identify least one particular keyword token associated with the particular business;

match the at least one particular keyword token to at least one industry vertical-important keyword identifying at least one naming seed template of a particular industry vertical in the business name candidate data; and generate the at least one particular naming candidate for the particular business based on the at least one naming seed template of the particular industry vertical in the business name candidate data; and transmit, to the computing device associated with the user, the at least one particular naming candidate for the particular business so that at least one of the at least one particular naming candidate is displayed, via a graphical user interface (GUI), to the user.

2. The system of claim 1, wherein the plurality of resources comprises:
   i) at least one data dictionary, comprising a business profile, user profile, a product profile, or a service profile;
   ii) at least one zone file,
   iii) domain name search log; or
   iv) at least one third party business directory.

3. The system of claim 1, wherein the data mining set comprises a plurality of business names of the plurality of existing businesses across the plurality of industry verticals; and
   wherein the instructions, when executed, further cause the system to:
      identify at least one uniform resource locator (URL) from the plurality of resources; and
      crawl a website associated with the URL to identify at least one business name of at least one existing business of the plurality of existing businesses.

4. The system of claim 1, wherein the at least one particular business naming candidate is one of at least one domain name candidate, at least one business name candidate, at least one trademark candidate, or at least one social handle.

5. The system of claim 1, wherein the business name candidate data comprises an industry ontology, comprising a mapping of the industry vertical-important keywords to a plurality of tokens associated with the plurality of existing businesses; and wherein the server is further programmed to utilize the industry ontology to match the at least one particular keyword token to the at least one industry vertical-important keyword to identify the at least one naming seed template of the particular industry vertical.

6. The system of claim 1, wherein the at least one naming candidate is at least one domain name candidate; and wherein the the server is further programmed to:
   determine the at least one domain name candidate based on at least one zone file with registered domain names.

7. The system of claim 1, wherein the at least one token scoring technique is one of: a term frequency keyword scoring technique, or an inverse document frequency keyword scoring technique.

8. The system of claim 1, wherein the server is further programmed to apply to the at least one particular naming candidate at least one creative variation that combines words to generate a particular modified naming candidate that does not exist within the plurality of resources, the at least one creative variation comprising:
   combining an adjective and a noun,
   combining a plurality of tokens according to alliterations,
   combining the plurality of tokens according to a plurality of rhyming tokens,
   combining a plurality of semantically similar words with a conjunction word,
   personifying at least one of the plurality of tokens, or
   creating an amalgam of the plurality of tokens; and
transmit, to the computing device associated with the user, the particular modified naming candidate so that the at least one particular modified naming candidate is displayed, via the GUI, to the user.

9. A method comprising:
   generating, by a processor, data mining set from a plurality of resources, wherein the data mining set comprises business data for a plurality of existing businesses across a plurality of industry verticals;
   utilizing, by the processor, a trained machine learning model to process the data mining set to identify a plurality of naming patterns for each industry vertical of the plurality of industry verticals;
   generating, by the processor, a plurality of naming seed templates for each industry based on the plurality of naming patterns for each industry vertical of the plurality of industry verticals;
   re-organizing, by the processor, the plurality of naming seed templates at least by industry vertical-important keywords based on at least one token scoring technique to form a business name candidate data;
   receiving, by the processor, from a computing device associated with a user, a request to generate at least one particular business naming candidate for a particular business associated with a user;
   wherein the request comprises personalized business data describing the particular business;
   tokenizing, by the processor, the personalized business data to identify least one particular keyword token associated with the particular business;
   matching, by the processor, the at least one particular keyword token to at least one industry vertical-important keyword identifying at least one naming seed template of a particular industry vertical in the business name candidate data; and
   generating, by the processor, the at least one particular naming candidate for the particular business based on the at least one naming seed template of the particular industry vertical in the business name candidate data; and transmitting, by the processor, to the computing device associated with the user, the at least one particular naming candidate for the particular business so that at least one of the at least one particular naming candidate is displayed, via a graphical user interface (GUI), to the user.

10. The method of claim 9, wherein the plurality of resources comprises:
   i) at least one data dictionary, comprising a business profile, user profile, a product profile, or a service profile;
   ii) at least one zone file,
   iii) domain name search log; or
   iv) at least one third party business directory.

11. The method of claim 9, wherein the data mining set comprises a plurality of business names of the plurality of existing businesses across the plurality of industry verticals; and
   wherein the instructions, when executed, further cause the system to:
      identify at least one uniform resource locator (URL) from the plurality of resources; and
      crawl a website associated with the URL to identify at least one business name of at least one existing business of the plurality of existing businesses.

12. The method of claim 9, wherein the at least one particular business naming candidate is one of at least one domain name candidate, at least one business name candidate, at least one trademark candidate, or at least one social handle.

13. The method of claim 9, wherein the business name candidate data comprises an industry ontology, comprising a mapping of the industry vertical-important keywords to a plurality of tokens associated with the plurality of existing businesses; and wherein the method further comprises:
   utilizing, by the processor, the industry ontology to match the at least one particular keyword token to the at least one industry vertical-important keyword to identify the at least one naming seed template of the particular industry vertical.

14. The method of claim 9, wherein the at least one naming candidate is at least one domain name candidate; and wherein the method further comprises:
   determining, by the processor, the at least one domain name candidate based on at least one zone file with registered domain names.

15. The method of claim 9, wherein the at least one token scoring technique is one of: a term frequency keyword scoring technique, or an inverse document frequency keyword scoring technique.

16. The method of claim 9, further comprising:
   applying, by the processor, to the at least one particular naming candidate at least one creative variation that combines words to generate a particular modified naming candidate that does not exist within the plurality of resources, the at least one creative variation comprising:
   combining an adjective and a noun,
   combining a plurality of tokens according to alliterations,
   combining the plurality of tokens according to a plurality of rhyming tokens,
   combining a plurality of semantically similar words with a conjunction word,
   personifying at least one of the plurality of tokens, or
   creating an amalgam of the plurality of tokens; and
   transmit, to the computing device associated with the user, the particular modified naming candidate so that the at least one particular modified naming candidate is displayed, via the GUI, to the user.

* * * * *